US011223724B2

(12) United States Patent
Nelson et al.

(10) Patent No.: US 11,223,724 B2
(45) Date of Patent: Jan. 11, 2022

(54) TRACKING USER INFORMATION DURING A WEBSITE VISIT TO ENHANCE CALL TRACKING CAPABILITIES

(71) Applicant: Lucency Technologies, Inc., Lehi, UT (US)

(72) Inventors: Daniel A. Nelson, Lehi, UT (US); Ryan Williams, Lehi, UT (US); Ryan McCoy, Lehi, UT (US); Neil Valentine, Lehi, UT (US); Steven Dalley, Lehi, UT (US); Bradley P. Pace, Lehi, UT (US); Andrew Hill, Lehi, UT (US)

(73) Assignee: Lucency Technologies, Inc., Lehi, UT (US)

( * ) Notice: Subject to any disclaimer, the term of this patent is extended or adjusted under 35 U.S.C. 154(b) by 0 days.

(21) Appl. No.: 14/538,685

(22) Filed: Nov. 11, 2014

(65) Prior Publication Data
US 2016/0100058 A1 Apr. 7, 2016

Related U.S. Application Data

(60) Provisional application No. 62/061,119, filed on Oct. 7, 2014.

(51) Int. Cl.
H04M 3/51 (2006.01)
H04M 3/487 (2006.01)
H04M 7/00 (2006.01)

(52) U.S. Cl.
CPC ........ H04M 3/5191 (2013.01); H04M 3/4878 (2013.01); H04M 7/0024 (2013.01); H04M 2203/1058 (2013.01)

(58) Field of Classification Search
CPC .................................................. H04M 3/5191
(Continued)

(56) References Cited

U.S. PATENT DOCUMENTS 7,006,607 B2    2/2006  Garcia
7,844,504 B1 *  11/2010 Flockhart ............... G06Q 30/06
                                                    705/26.1

(Continued)

FOREIGN PATENT DOCUMENTS

WO    WO2019200408    10/2019

OTHER PUBLICATIONS

PCTUS2019/027555, Oct. 19, 2019, International Search Report and Written Opinion.

Primary Examiner — Ahmad F. Matar
Assistant Examiner — Jirapon Intavong
(74) Attorney, Agent, or Firm — Ray Quinney & Nebeker P.C.; Paul N. Taylor

(57) ABSTRACT

When a user visits a website in response to selecting an advertisement, information about the user and/or about the user's visit to the website can be obtained. During the user's visit to the website, a tracking phone number can be displayed. If the user calls the tracking phone number to complete a purchase, an identifier can be embedded in the phone call. A system that handles the phone call can extract the identifier and use it to uniquely associate the phone call with the information obtained about the user's online activity. The system can also use the identifier to obtain the information so it can be used to customize the routing and/or handling of the phone call. The information may also be employed to dynamically determine if or when to present a tracking phone number to the user.

19 Claims, 6 Drawing Sheets

(58) Field of Classification Search
USPC .................................................. 379/265.09
See application file for complete search history.

(56) References Cited

U.S. PATENT DOCUMENTS

| | | | | |
|---|---|---|---|---|
| 8,238,540 | B1* | 8/2012 | Duva | H04M 3/51 |
| | | | | 379/265.01 |
| 2004/0107137 | A1 | 6/2004 | Skinner | |
| 2004/0117383 | A1 | 6/2004 | Lee | |
| 2009/0262914 | A1 | 10/2009 | Khouri | |
| 2011/0125593 | A1 | 5/2011 | Wright | |
| 2011/0158398 | A1* | 6/2011 | Kannan | H04L 12/1827 |
| | | | | 379/265.09 |
| 2012/0208526 | A1* | 8/2012 | Fisher | H04M 3/2218 |
| | | | | 455/423 |
| 2012/0300916 | A1* | 11/2012 | Woicke | H04M 3/5235 |
| | | | | 379/201.12 |
| 2014/0369485 | A1* | 12/2014 | Hollander | H04M 3/5166 |
| | | | | 379/265.02 |
| 2015/0120438 | A1* | 4/2015 | Gilberd | G06Q 30/0255 |
| | | | | 705/14.45 |
| 2015/0350435 | A1* | 12/2015 | Connolly | G06Q 30/0631 |
| | | | | 379/265.03 |
| 2019/0320065 | A1 | 10/2019 | Valentine et al. | |

* cited by examiner

TRACKING USER INFORMATION DURING A WEBSITE VISIT TO ENHANCE CALL TRACKING CAPABILITIES

CROSS-REFERENCE TO RELATED APPLICATIONS

This application claims the benefit of U.S. Provisional Patent Application No. 62/061,119 filed on Oct. 7, 2014.

BACKGROUND

Most companies employ analytics to track the success of their online marketing campaigns. A key metric used in analytics is the conversion rate. The conversion rate of a marketing campaign is typically generated based on the number of advertisements selected and the number of sales that resulted from these selections. In a typical online scenario, a company pays an advertising service, such as Google AdWords, to present advertisements within a website based on one or more attributes of the user visiting the site or the manner in which the user reached the site (e.g., keywords used in a search, referring site, search history, etc.).

When a user selects an advertisement, the user is typically routed to the company's website where the user can complete a purchase. When routing the user to the company's website, the referring website typically provides information that can be used to identify the advertisement that the user selected. Then, if the user completes a purchase on the company's website, the purchase can be linked to the advertisement that the user selected indicating that a "conversion" of the advertisement has occurred. Similarly, if the user does not complete a purchase on the company's website, the failure to convert the selection of the advertisement into a sale can be recorded. By tracking the number of times an advertisement is selected and the number of times that these selections lead to a sale, the company can generate the conversion rate of the advertising campaign. A higher conversion rate of an advertisement campaign would therefore indicate that the company should spend more on the campaign. This is one example of how the success of an advertising campaign can be measured, although other techniques can also be employed.

Although this process of linking a purchase to the selection of an advertisement can be easily accomplished when the user completes the purchase online, the same is not true when the user completes the purchase offline. For example, many websites provide a phone number that a user can call to complete a purchase by speaking with a representative. If the user, after having selected an advertisement to reach the company's website, decides to complete the purchase over the phone, there will be no direct link between the online selection of the advertisement and the offline purchase.

To address this issue, a technique known as call tracking has been developed. To implement call tracking, a company will employ tracking phone numbers to enable a phone call to be associated with a previous selection of an advertisement. For example, when a user selects an advertisement that routes the user to the company's website, the website can be customized to include a particular phone number that can be uniquely associated with that user for a period of time. Then, if a phone call is received at the particular phone number, the company can know that it was likely the user that made the call since the particular phone number would not have been displayed to other users during the period of time. If the user then makes a purchase over the phone, the purchase can be linked back to the advertisement that the user originally selected. The use of tracking phone numbers in this manner therefore provides a link between the online and offline actions. This link can allow a company to track the conversion rate of its campaigns even though some conversions may occur over the phone.

BRIEF SUMMARY

The present invention extends to methods, systems, and computer program products for implementing call tracking. When a user visits a website in response to selecting an advertisement, information about the user and/or about the user's visit to the website can be obtained. During the user's visit to the website, a tracking phone number can be displayed. If the user calls the tracking phone number to complete a purchase, an identifier of the user can be embedded within the phone call and used to retrieve the information obtained while the user visited the website. This information can then be used to customize the routing and/or handling of the phone call. Because an identifier is embedded within the phone call, the identifier, rather than the phone number, can be used to link the phone call back to the user so that the result of the phone call can be attributed back to the user's online actions.

In one embodiment, the present invention is implemented by a server system as a method, for using an identifier, other than a phone number, to link a user's phone call to a user's online activities. A request for a webpage of a website is received from a client system. The webpage is sent to the client system. The webpage is configured to obtain information about a user's interaction with the website. The webpage is also configured to display a tracking phone number. An identifier is associated with the tracking phone number and with the information obtained about the user's interaction with the website. In response to the user placing a phone call to the tracking phone number, the identifier is embedded within the phone call. An indication that the user completed an order during the phone call is received from a call center system that receives the phone call. The indication includes the identifier. The order is associated with the information obtained about the user's interaction with the website.

In another embodiment, the present invention is implemented by a call center system as a method for using an identifier, other than a phone number, to link a user's phone call to a user's online activities. A phone call at a tracking phone number is received from a user. The phone call includes an embedded identifier. The identifier is extracted from the phone call. After handling the phone call, an indication is stored that the phone call resulted in an order. The identifier is sent to a server system along with the indication that the phone call resulted in an order to thereby allow the order to be associated with information obtained by the server system about the user's interaction with a website on which the tracking phone number was displayed.

In another embodiment, the present invention is implemented by a call center system as a method for using an identifier, other than a phone number, to link a user's phone call to a user's online activities. A phone call at a tracking phone number is received from a user. The phone call includes an embedded identifier. The identifier is extracted from the phone call. The identifier is sent to the server system to request information obtained by the server system about the user's interaction with a website on which the tracking phone number was displayed. The information is received. At least some of the information is displayed to a representative to which the phone call is routed to thereby assist the representative in handling the phone call.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention may comprise or utilize special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

Figure 1:
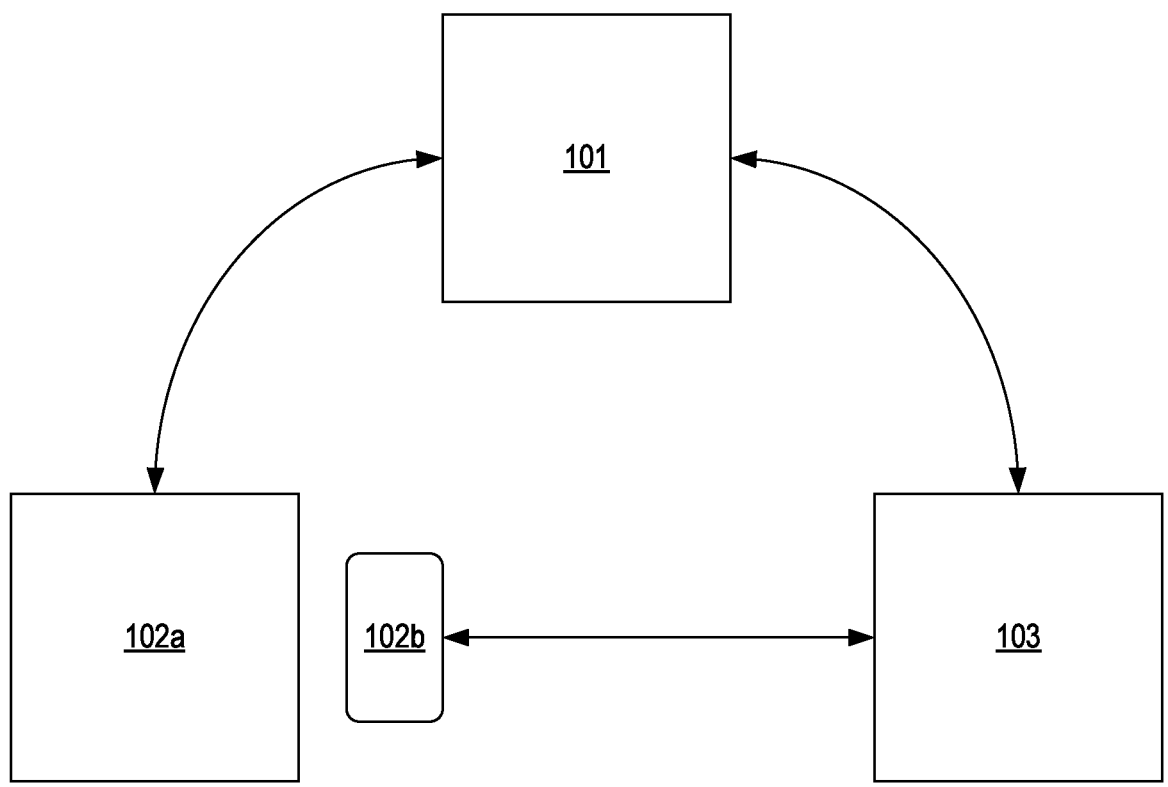
FIG. 1 illustrates an example computing environment in which the present invention can be implemented.

FIG. 1 illustrates an example computer environment 100 in which the present invention can be implemented. Computer environment 100 includes a server system 101, a client system 102*a*, a client phone 102*b*, and a call center system 103. For purposes of this specification, server system 101 will be described as providing a website to client system 102*a* and as maintaining a database that stores information about a user that visits the website.

Client system 102*a* can represent any of the various types of devices that a user uses to access a website, including mobile devices. Although client phone 102*b* is depicted as a separate system, in many implementations, client system 102*a* and client phone 102*b* may be the same device such as when a user accesses the website on a mobile phone. The depiction of separate devices is intended to emphasize that the present invention is employed when a user visits a website seeking to make a purchase but completes the purchase over the phone.

Call center system 103 can represent a system employed by a representative at a call center to at least partially handle a phone call from client phone 102*b*, including to assist a user to complete a purchase. Call center system 103 can also comprise a system that handles the routing of phone calls to a particular representative and that obtains information from server system 101. The term "call center" should be construed broadly to represent any configuration where a representative handles phone calls.

The depiction of server system 101 and call center system 103 as being two separate systems is for purposes of illustration only. In some cases, these two systems may be part of the same system or operated by the same entity. In other cases, server system 101 can represent the system of a company that uses a service provided by another company that implements call center system 103.

To describe the features of the present invention, the remainder of the specification will employ an example of a user that is seeking to book a hotel room. However, the present invention is applicable to scenarios where the user wants to purchase any item or service. Accordingly, the present invention extends to the functionality for enhancing call tracking capabilities regardless of the type of goods or services that are advertised or purchased.

Figure 2:
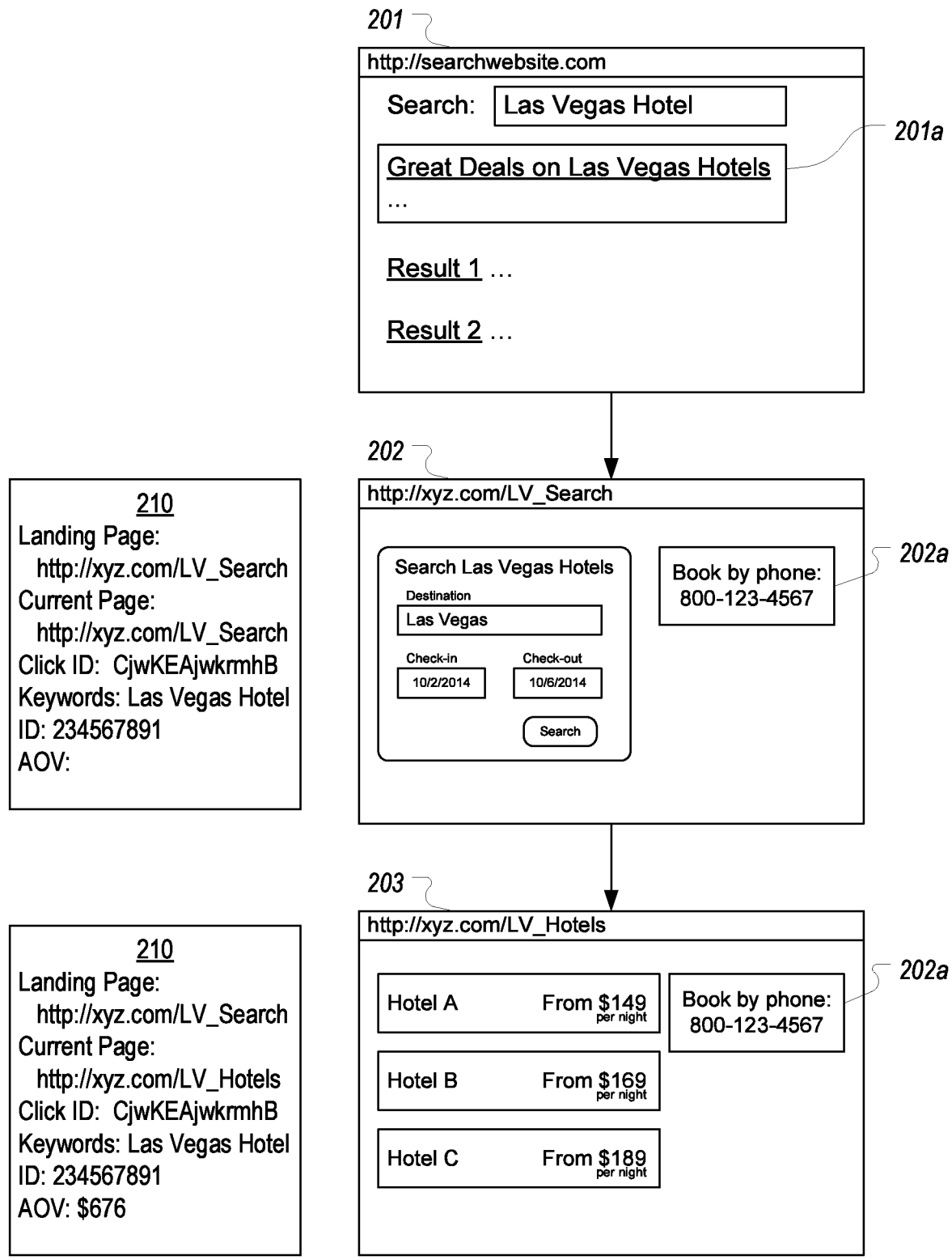
FIG. 2 illustrates a series of webpages and a data structure that is populated as a user visits the webpages.

FIG. 2 illustrates a series of example webpages 201-203 that can be displayed to a user as the user searches for a hotel room to book. Webpage 201 represents the results of a search for "Las Vegas Hotel." As is common, in addition to the results of the search query, an advertisement 201*a* is also displayed within webpage 201. In this example, it will be assumed that a company paid to have advertisement 201*a* displayed whenever a user performed a search that included the keywords "Las Vegas" and "hotel." Because the cost of such advertisements can be relatively expensive, a company may desire to track the effectiveness of such advertisements.

If the user selects advertisement 201a, the user's browser will be redirected to webpage 202 which, in this example, has a URL of http://xyz.com/LV_Search. Webpage 202 includes a search box where the user can perform a search for hotels that are available between specified dates. Webpage 202 also includes a phone number 202aIn some embodiments, phone number 202a can represent a tracking phone number that is uniquely associated with the user for a specified period of time.

FIG. 2 also illustrates a data structure 210 that is populated with information during the user's visit to the website xyz.com. In many implementations of the present invention, data structure 210 may be a cookie that is stored within the browser on client system 102a. However, other types of data structures may also be used. Data structure 210 can be used to accumulate information that may be useful for linking the user's online actions with subsequent offline actions such as when the user completes an order over the phone. As will be further described below, at least some of the information accumulated within data structure 210 can be provided to call center system 103 when the user makes a phone call thereby allowing the handling of the phone call to be customized based on this information.

As shown, while the user is on webpage 202, various fields of data structure 210 have been populated. The landing page field defines the first webpage of the website xyz.com that the user visited, or in other words, the webpage to which the user was redirected in response to selecting advertisement 201a, which in this case is http://xyz.com/LV_Search.

Data structure 210 can also include a current page field. The current page field defines the current (or last) page that the user is viewing (or has viewed). As shown, while the user is viewing webpage 202, the current page field is populated with the same URL as the landing page field. Although not shown, data structure 210 may include one or more additional webpages that the user visits including all webpages that are viewed during a visit.

Data structure 210 may also include a click ID field and a keywords field. The keywords field lists the keywords that the user searched to arrive at webpage 201A. The click ID is a unique identifier provided by the advertising service that uniquely identifies the user's selection of advertisement 201a (e.g., the gclid field provided by Google). Although not shown, the click ID and the keywords are typically appended to the end of the URL of webpage 202 by the search provider.

Data structure 210 may also include an ID field. A company may employ an ID to uniquely identify a user that visits its website. Data structure 210 may also include an average order value ("AOV") field. The AOV field represents an estimate of the average value of a potential purchase that the user may make. In this example, while the user is viewing webpage 202, the AOV field is left unpopulated because it has not yet been determined what the average value of the user's potential hotel booking may be.

As shown in webpage 202, the user has entered check-in and check-out dates of Oct. 10, 2014 and Oct. 10, 2014 respectively into the search box. In response to the user's selection of the search button, webpage 203 will be displayed. Webpage 203 includes a listing of various hotels that have a room available during the user's specified dates. In this example, once the user has specified the desired check-in and check-out dates, it can be determined what the average order value is for this user. In particular, the average order value can be determined as the average total cost of a four night stay in the available Las Vegas hotels. Using the information provided in webpage 203, the average order value for this user can be calculated as $676 (4 nights×$169 average/night). Accordingly, the AOV field in data structure 210 is shown as having been populated once the user is viewing webpage 203.

The average order value can be calculated based on many different criteria and may be updated as the user provides more information during a visit to a website. The AOV field therefore provides a rough estimate of the potential value of completing an order with the user. Data structure 210 may contain any other additional types of information that may be useful for linking a user's online and offline actions or for otherwise enhancing the capabilities of call tracking including the ability to dynamically route a phone call to a particular representative based on the information in data structure 210. For example, data structure 210 may include an indication of whether the user is located in or out of market (e.g., whether the user is located in Las Vegas or another market). Such information can be determined in various ways as is known in the art. Data structure 210 may also include an indication of whether the user was searching for a particular property, item, or service (e.g., whether the user searched for or was looking at a particular hotel).

Figure 3A:
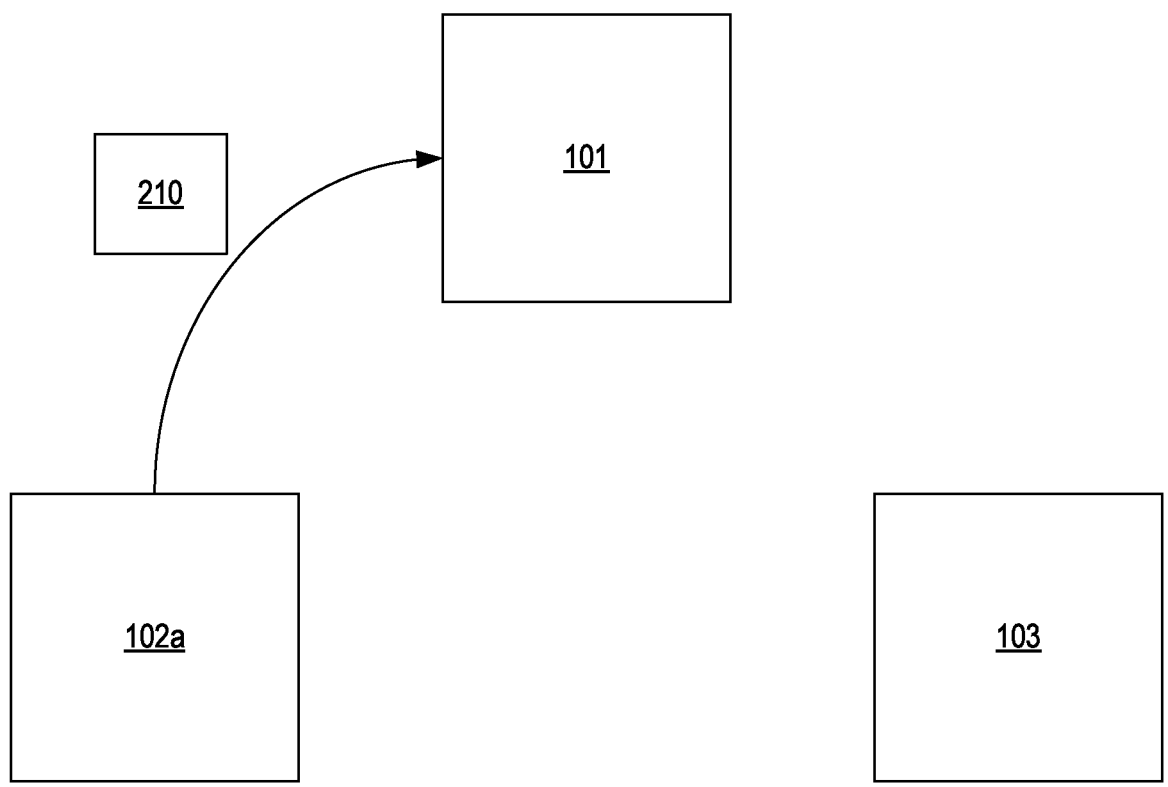
FIGS. 3A-3C illustrate various communications that occur among the computer systems of FIG. 1 when a user transitions from interacting with a website to placing a phone call to a number that was listed on the website.
Figure 3B:
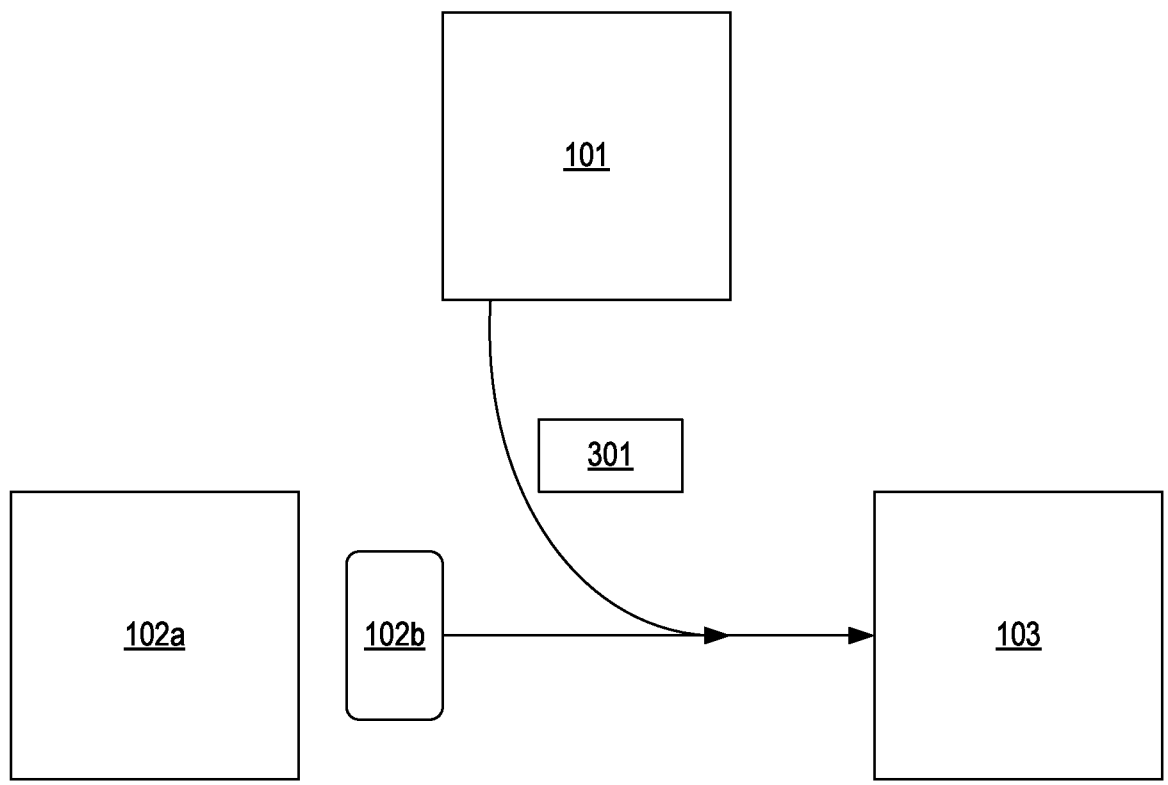
Figure 3C:
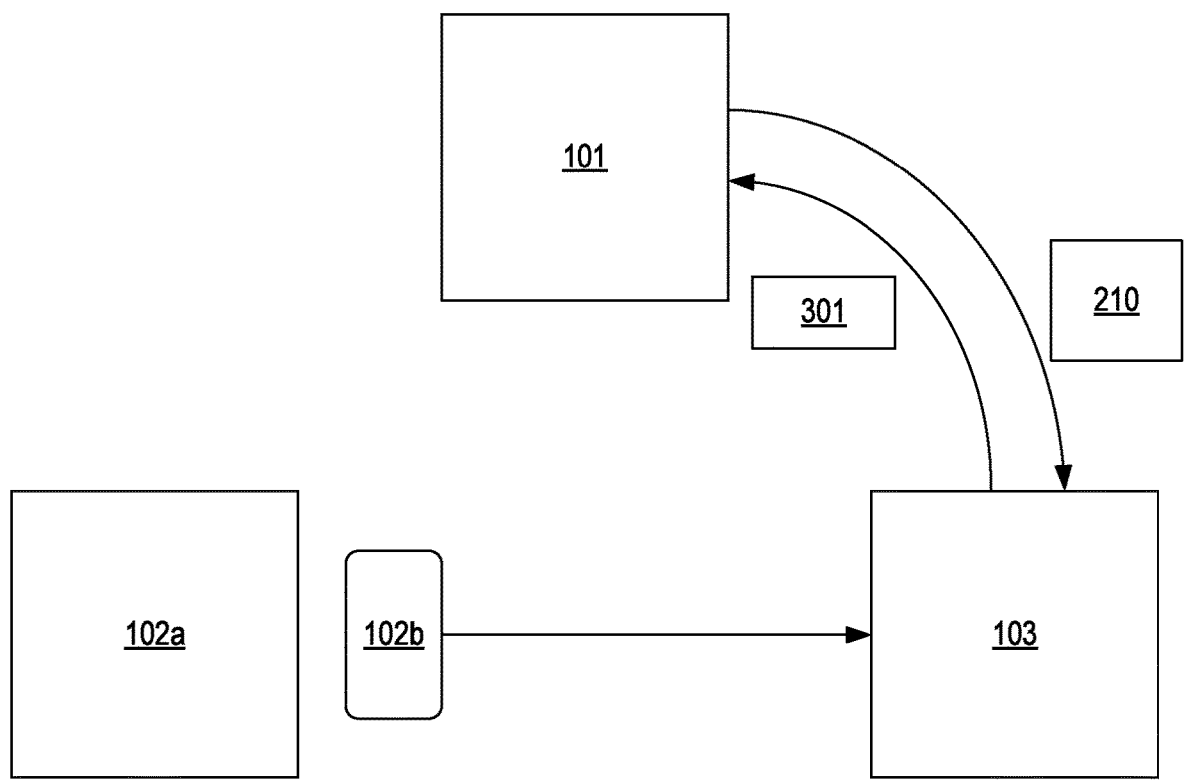

FIGS. 3A-3C illustrate a sequence of steps that can be performed to transfer at least some of the information in data structure 210 from client system 102a to server system 101 and ultimately to call center system 103. FIG. 3A illustrates that client system 102a transmits data structure 210 (or at least some of the information contained in data structure 210) to server system 101. Client system 102a may be configured to transmit data structure 210 at various times such as whenever an HTTP request is made to server system 101 (e.g., each time the user opens a new webpage of the xyz.com website). For example, FIG. 3A can represent the communication that occurs when the user selects the search button within webpage 202 which results in webpage 203 being displayed. Server system 101 may include a database where the information from data structure 210 may be stored. In some embodiments, server system 101 can maintain information about a user so that the information can be used at a later time including to aggregate additional information obtained about the user during a subsequent visit to the website.

For example, the value of the ID field may be used to uniquely represent the user (or at least client system 102a) within server system 101. In the case that client system 102a stores data structure 210 in the form of a cookie or other data structure that persists beyond a particular visit to the website, and assuming server system 101 already stores information for the user, the ID field can be used during the user's subsequent visit to the website to link any new information generated on client system 102a during the subsequent visit with the stored information for the user on server system 101. Accordingly, FIG. 3A can represent the case were the information in data structure 210 is stored on server system 101 both when server system 101 does not previously store information for the user and when server system 101 already stores information for the user. In either case, the information is stored on server system 101 with an identifier (e.g., the value of the ID field) that uniquely identifies the user (or at least client system 102a).

FIG. 3B illustrates that the user has stopped interacting online and has placed a phone call to phone number 202a using client phone 102b. Server system 101 can maintain information that maps phone number 202a to the user so that when a phone call is received at phone number 202a, it can be assumed that the user is making the phone call. For example, server system 101 can include a mapping between the user's ID and the phone number (e.g., ID 234567891→800-123-4567). Because server system 101 knows that the phone number is linked with the user, server system 101 (or another system with which server system 101 can communicate) can embed information into the phone call that identifies the user. FIG. 3B, for example, shows that server system 101 embeds an identifier 301 (e.g., the value of the ID field) into the phone call. In some embodiments, identifier 301 can be embedded as a Session Initiation Protocol ("SIP") header when the phone call employs the SIP.

As was described in the Background, traditional call tracking employs this mapping between the phone number and the user to attribute the phone call back to the user's online actions. In this traditional approach, because the phone number acts as the identifier, the phone number cannot be reused until the phone call has been handled. In contrast, the present invention embeds the identifier within the phone call so that the embedded identifier can immediately serve as the identifier once the phone call is received thereby allowing the phone number to be reused (i.e., displayed to another user) sooner. For this reason, the present invention allows call tracking to be implemented with fewer phone numbers.

FIG. 3C illustrates that call center system 103 can extract the identifier 301 from the phone call and use it to request at least some of the information of data structure 210 from server system 101. For example, when call center system 103 receives the phone call from client phone 102b, it can extract (e.g., from a SIP header) the ID 234567891. Call center system 103 can then send a request to server system 101 that includes ID 234567891. In response, server system 101 can send data structure 210 (or at least some of the information in data structure 210) whether the information was obtained from the user's current (or most recent) visit to the website or from an earlier visit. Once call center system 103 has received data structure 210, it can customize the handling of the phone call. This customization can include customizing how the phone call is routed prior to the phone call being answered as well as customizing how a representative handles the phone call once answered.

Call center system 103 can be configured to route the phone call to a particular representative based on information in data structure 210. For example, if the information in data structure 210 includes an AOV field with a high value, the phone call may be routed to a representative that is most likely to be able to complete the order with the user. Similarly, the phone call can be routed to a representative based on the current page that the user is or was viewing such as by routing the phone call to a representative that is more familiar with Las Vegas hotels.

Once a call is routed to a particular representative, at least some of the information in data structure 210 can be displayed to the representative. For example, the current webpage that the user is or was viewing can be displayed to better inform the representative of the type of item or service that the user likely desires to purchase. Using the hotel example, displaying the current webpage can inform the representative that the user is searching for Las Vegas hotels with a check-in date of Oct. 2, 2014 and a check-out date of Oct. 6, 2012. Similarly, the sequence of webpages that the user visited can be displayed to the representative. For example, if the user had visited webpages for hotels in Los Angeles prior to visiting a webpage for hotels in Las Vegas, the representative may ask the user about Los Angeles hotels as well.

In some embodiments, once the phone call is routed to a particular representative, server system 101 and/or call center system 103 can store an indication that the particular representative handled the call. In this way, if the user makes another phone call at the phone number, the call can be routed back to the same representative.

Once it has been determined whether the phone call has resulted in an order, server system 101 can use identifier 301 to create an association between advertisement 201a and the result. Because call center system 103 knows the identifier that is associated with the phone call (i.e., identifier 301), call center system 103 can include the identifier when reporting any result of the phone call back to server system 101. This allows server system 101 to associate the result with the appropriate data structure that defines the online actions of the user that led to the phone call (i.e., data structure 210). For example, if the user books a hotel, identifier 301 can be used to associate information about the booking with the information in data structure 210 including, for example, associating the value of the booking with the cost of the selection of advertisement 201a. Associating the result of the phone call with advertisement 201a can allow the company to better calculate the conversion rate of advertisement 201a.

By including the click ID in data structure 210, server system 101 can associate the result of the phone call directly with the cost of the selection of advertisement 201a. Because the click ID uniquely identifies the selection of advertisement 201a, it can be used to identify how much the company paid for the selection. In the case the phone call results in an order, server system 101 can create an association between the amount paid for the selection of advertisement 201a and the value of the resulting order.

Figure 4:
FIG. 4 illustrates an example of a webpage that includes an advertisement with a click-to-call phone number.

In some embodiments, a user may make a phone call before visiting the company's website. In such cases, the company will not have the opportunity to create data structure 210 before the phone call. FIG. 4, for example, illustrates a webpage 401 that includes search results similar to webpage 201. In contrast to webpage 201, webpage 401 includes an advertisement 401a that provides an option to click to call the company. Such an option may be provided when client system 102a and client phone 102b are the same (i.e., when the user is browsing on a phone-capable device).

If the user selects the click-to-call option in advertisement 401a, the user's device will immediately place a phone call to the phone number which will ultimately be routed to call center system 103. To facilitate associating the phone call with advertisement 401a, an identifier can be embedded within the phone call. In embodiments where the advertising service provides a click ID, the advertising service can embed the click ID that identifies the user's selection of advertisement 401a into the phone call. Then, the results of the phone call can be associated with the click ID as is described above.

As a specific example, when a user selects a click-to-call phone number within a Google Adword's advertisement, Google causes a phone call to be a made to the number listed in the advertisement. In accordance with embodiments of the present invention, Google can embed the gclid for the selection of the advertisement into this phone call. Once call center system 103 receives the phone call, it can extract the gclid and associate it with the result of the phone call as well as any information obtained about the user during the phone call. In this way, the conversion rate of the advertisement can be more accurately determined even when the selection of the advertisement does not cause the user to visit the company's website.

In some embodiments, when an identifier is embedded within the phone call in response to a user selecting a click-to-call option in an advertisement, call center system 103 can access the embedded identifier (e.g., the gelid) and use it to immediately request information from the advertising service (e.g., Google). This information can include any keywords which the user searched to arrive at the search results which included the click-to-call advertisement as well as an identification of the advertising campaign to which the click-to-call advertisement pertains. Such information can then be used by call center system 103 to dynamically route the phone call such as by routing the phone call to a particular agent or department that handles calls related to the particular advertising campaign or keyword(s). Such information may also be used during the phone call to customize how the phone call is handled.

In a particular example similar to the one described above, Google may provide an interface through which call center system 103 can submit a gclid to receive information about the click-to-call advertisement associated with the gclid. When call center system 103 receives a phone call that includes a gclid, it can immediately (i.e., prior to routing the phone call) submit the gclid to Google through the interface to receive the relevant information. In this way, the information can be immediately received to allow the phone call to be routed and/or handled based at least partially on the information.

In some embodiments, data structure 210 can be employed to determine when to display a tracking phone number to the user. For example, because it typically costs more to have a user call a call center to complete an order rather than to complete an order online, the decision of if or when to display a tracking phone number can be based on the average order value within data structure 210. If the AOV field of data structure 210 indicates that the potential order is of high value, a tracking number may be prominently displayed to encourage the user to call the call center so that a highly qualified representative can assist the user. In contrast, if the AOV field of data structure 210 indicates that the potential order is of low value, a tracking phone number may not be displayed at all or may only be displayed once the user has reached a particular webpage.

In summary, the present invention allows an identifier, other than a phone number, to be used to link a phone call to a particular user. By embedding the identifier into the phone call, a phone number can be reused sooner than with traditional approaches thereby minimizing the number of tracking phone numbers that are required to implement call tracking. Reducing the number of tracking phone numbers that used can reduce the cost and complexity of a call center system.

Further, by enhancing call tracking abilities, the present invention can assist a company to advertise more efficiently. The present invention allows a company to collect significantly more information that can be used to link a user's online and offline activities. In this way, offline sales can be strongly linked back to the online activities that led to the sales. The more accurate conversion rates that can be calculated with these links will enable a company to better identify how to most efficiently spend its advertising dollars.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a server system, for using an identifier, other than a phone number, to link a user's phone call to a user's online activities so that a call-in tracking phone number can be more-rapidly released for association with other users, the method comprising:
    receiving, from a client system, a request for a webpage of a web site;
    sending, to the client system, the webpage, the webpage being configured to obtain information about a user's interaction with the website, and to populate a data structure with information relating to the user's visit to the website;
    populating the data structure with a landing page field identifying the webpage to which the user was redirected in response to selecting an advertisement, a page visited field showing additional pages visited by the user during a visit, a keywords field listing the keywords that the user searched to arrive at the webpage, and an average order value field providing an estimated value of a call from the user purchase, wherein the webpage is configured to display a tracking phone number based on the average order value field being above a threshold order value; and wherein populating the data structure with the average order value field comprises populating the data structure with an average cost of a period of stay in a lodging facility at a destination;
    associating an identifier with the tracking phone number and with the information obtained about the user's interaction with the website;
    in response to the user placing a phone call to the tracking phone number, embedding the identifier within the phone call, associating the user with the identifier, and causing the phone call to be selectively routed to a representative of a call center based at least in part on the estimated value of the call from the user included within the populated data structure;
    based on embedding the identifier within the phone call and associating the user with the identifier, making the tracking phone number available for use as a tracking number on webpages displayed to other users;
    causing information populated within the data structure to be displayed to the representative of the call center;
    receiving, from a call center system that received the phone call, an indication that the user completed an order during the phone call; and
    associating, by the server system, the identifier with the indication that the user completed the order.

2. The method of claim 1, wherein the data structure includes a geographic location of the user.

3. The method of claim 1, further comprising:
    after embedding the identifier within the phone call and prior to receiving the indication that the user completed the order, providing the tracking phone number for display within a webpage presented to another client system.

4. The method of claim 1, wherein the identifier identifies an advertisement that was selected by the user to initiate the phone call, the method further comprising:
    prior to causing the phone call to be selectively routed, sending the identifier to an advertising service that displayed the advertisement;
    receiving information about the advertisement from the advertising service; and routing the phone call based further on the information received from the advertising service.

5. The method of claim 1, further comprising receiving search criteria from the client system defining the destination, a check-in date, and a check-out date, wherein the destination, the check-in date, and the check-out date are used in determining the average cost of the period of stay in the lodging facility at the destination.

6. The method of claim 1, wherein the lodging facility at the destination is a particular facility searched by the user of the client system.

7. The method of claim 1, wherein populating the data structure further comprises populating the data structure with an indication regarding whether the user is in-market or out-of-market.

8. The method of claim 1, wherein populating the data structure with the average order value field comprises one or more of:
populating the data structure with an estimate of an average order value for a potential purchase for the user; or
populating the data structure with an estimate for multiple potential purchases for the user.

9. The method of claim 1, wherein populating the data structure further comprises updating the estimated value of the call based on additional information provided to the website by the client system.

10. The method of claim 1, wherein
if the average order value field is greater than or equal to the threshold order value, then the tracking phone number is displayed on the webpage, and
if the average order value field is less than the threshold order value, then the tracking phone number is not displayed on the webpage.

11. A system, comprising:
one or more processors;
memory in electronic communication with the one or more processors; and
instructions stored in the memory, the instructions being executable by the one or more processors to:
receive, from a client system, a request for a webpage of a web site;
send, to the client system, the webpage, the webpage being configured to obtain information about a user's interaction with the website, and to populate a data structure with information relating to the user's visit to the website;
populate the data structure with a landing page field identifying the webpage to which the user was redirected in response to selecting an advertisement, a page visited field showing additional pages visited by the user during a visit, a keywords field listing the keywords that the user searched to arrive at the webpage, and an average order value field providing an estimated value of a call from the user purchase, wherein the webpage is configured to display a tracking phone number based on the average order value field being above a threshold order value; and wherein populating the data structure with the average order value comprises determining the average cost of a period of stay in a lodging facility at a destination;
associate an identifier with the tracking phone number and with the information obtained about the user's interaction with the website;
in response to the user placing a phone call to the tracking phone number, embed the identifier within the phone call, associate the user with the identifier, and cause the phone call to be selectively routed to a representative of a call center based at least in part on the estimated value of the call from the user included within the populated data structure;
based on embedding the identifier within the phone call and associating the user with the identifier, make the tracking phone number available for use as a tracking number on webpages displayed to other users;
cause information populated within the data structure to be displayed to the representative of the call center;
receive, from a call center system that received the phone call, an indication that the user completed an order during the phone call; and
associate, by the server system, the identifier with the indication that the user completed the order.

12. The system of claim 11, wherein the data structure includes a geographic location of the user.

13. The system of claim 12, wherein populating the data structure with the average order field comprises one or more of:
populating the data structure with an estimate of an average order value for a potential purchase for the user; or
populating the data structure with an estimate for multiple potential purchases for the user.

14. The system of claim 11, further comprising instructions being executable by the one or more processors to:
after embedding the identifier within the phone call and prior to receiving the indication that the user completed the order, provide the tracking phone number for display within a webpage presented to another client system.

15. The system of claim 11, wherein the identifier identifies an advertisement that was selected by the user to initiate the phone call, and further comprising instructions being executable by the one or more processors to:
prior to causing the phone call to be selectively routed, send the identifier to an advertising service that displayed the advertisement;
receive information about the advertisement from the advertising service; and
route the phone call based further on the information received from the advertising service.

16. The system of claim 11, further comprising instructions being executable by the one or more processors to receive search criteria from the client system defining the destination, a check-in date, and a check-out date, wherein the destination, the check-in date, and the check-out date are used in determining the average cost of the period of stay in the lodging facility at the destination.

17. The system of claim 11, wherein the lodging facility at the destination is a particular facility searched by the user of the client system.

18. The system of claim 11, wherein populating the data structure further comprises one or more of:
populating the data structure with an indication regarding whether the user is in-market or out-of-market; or
updating the estimated value of the call based on additional information provided to the website by the client system.

19. The system of claim 11, wherein
if the average order value field is greater than or equal to the threshold order value, then the tracking phone number is displayed on the webpage, and if the average order value field is less than the threshold order value, then the tracking phone number is not displayed on the webpage.

\* \* \* \* \*